(12) United States Patent
Kuo et al.

(10) Patent No.: US 11,001,410 B2
(45) Date of Patent: May 11, 2021

(54) PULP-MOLDED PAPER CONTAINER

(71) Applicant: Golden Arrow Printing Technology (Kunshan) Co., LTD., Kunshan (CN)

(72) Inventors: Chien-Kuan Kuo, New Taipei (TW); Chun-Huang Huang, New Taipei (TW)

(73) Assignee: GOLDEN ARROW PRINTING TECHNOLOGY (KUNSHAN) CO., LTD., Kunshan (CN)

( * ) Notice: Subject to any disclaimer, the term of this patent is extended or adjusted under 35 U.S.C. 154(b) by 0 days.

(21) Appl. No.: 16/544,899

(22) Filed: Aug. 19, 2019

(65) Prior Publication Data
US 2020/0307855 A1    Oct. 1, 2020

(30) Foreign Application Priority Data

Mar. 28, 2019  (CN) .......................... 201920411318.7

(51) Int. Cl.
*B65D 6/00* (2006.01)
*B29C 43/00* (2006.01)
*B65D 43/16* (2006.01)

(52) U.S. Cl.
CPC ............ *B65D 13/04* (2013.01); *B29C 43/003* (2013.01); *B65D 43/166* (2013.01);
(Continued)

(58) Field of Classification Search
CPC .... B65D 13/04; B65D 43/166; B65D 85/324; B65D 43/169; B65D 43/0204; B65D 43/0208; B65D 43/021; B65D 45/18; B65D 5/4266; B29C 43/003; D21J 3/00; D21H 27/10; D21F 13/00

USPC .............. 229/406, 407, 125.36; D9/426; 206/521.1, 557; 220/4.23, 4.21, 4.22, 220/810, 839
See application file for complete search history.

(56) References Cited

U.S. PATENT DOCUMENTS 4,088,259 A * 5/1978 Sutton ....................... D21J 7/00
                                                    206/521.1
6,042,000 A * 3/2000 Kawamoto .......... B65D 43/162
                                                    229/406
(Continued)

FOREIGN PATENT DOCUMENTS

CN           1070973 A     4/1993
CN         204624080 U     9/2015
(Continued)

*Primary Examiner* — Christopher R Demeree
(74) *Attorney, Agent, or Firm* — Cheng-Ju Chiang

(57) ABSTRACT

A pulp-molded paper container is introduced herein, which comprises a top cover body, a bottom box body and at least one pivot portion. The top cover body comprises a top sidewall having an inner surface. The bottom box body comprises a bottom sidewall having an outer surface and a recess portion. A plane-to-plane contact is constituted with occurrence of a static friction force, between the inner surface of the top sidewall and the outer surface of the bottom sidewall, by way of an elastic deformation effect of the recess portion under a manner while the bottom box body and the top cover body mutually matched in a closed manner, whereby the static friction force can make a tight retention occurring along between the top cover body and the bottom box body.

13 Claims, 7 Drawing Sheets

(52) U.S. Cl.
CPC ............ *B29K 2995/0056* (2013.01); *B65D 2543/00194* (2013.01); *B65D 2543/00268* (2013.01)

(56) References Cited

U.S. PATENT DOCUMENTS 7,922,021 B2 * 4/2011 Golden ............... B65D 43/169
 220/4.22
8,418,871 B1 * 4/2013 LaMasney ............ B65D 45/18
 220/324

FOREIGN PATENT DOCUMENTS

| CN | 108163351 A | 6/2018 |
|---|---|---|
| WO | 2011/009229 A1 | 1/2011 |

* cited by examiner

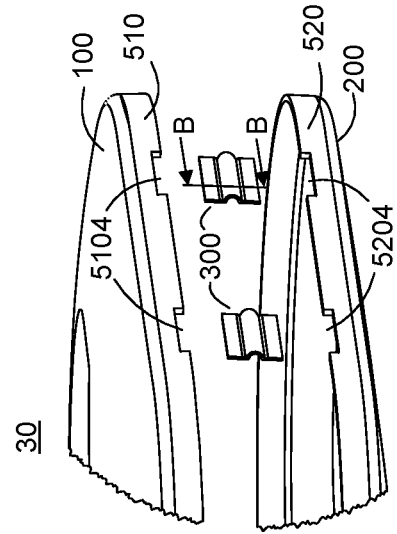
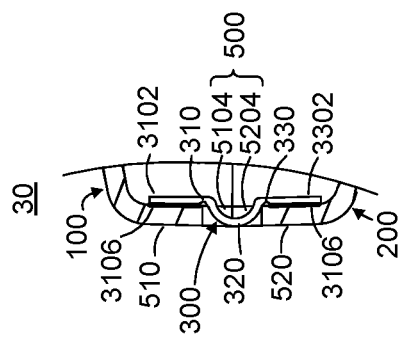
Fig. 9
Fig. 11
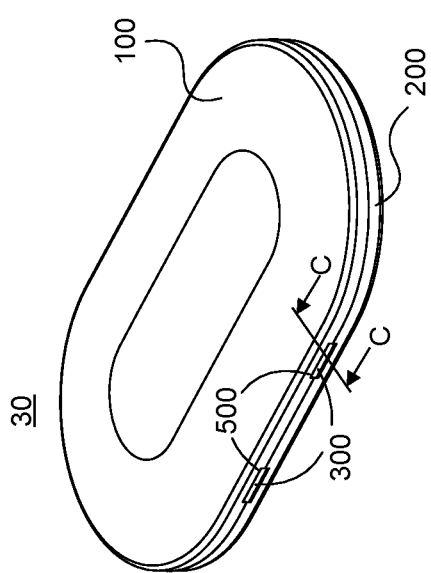
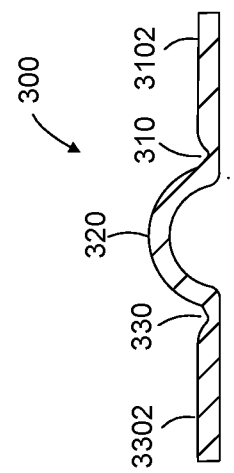
Fig. 8
Fig. 10

PULP-MOLDED PAPER CONTAINER

FIELD OF THE INVENTION

The present invention relates to a pulp-molded paper container applied in a technical field of packaging materials, and in particular, a pulp-molded paper container manufactured by a wet fiber pulp-molding process.

BACKGROUND OF THE INVENTION

Conventional paper-made boxes brought several problems. For example, some conventional paper-made boxes might include both paper-made elements and plastic material elements, such as a paper cup and a plastic cover, in parts thereof. A U.S. Pat. No. 8,418,871 discloses that a top cover and a pivot portion both are made from thermoplastic material pieces, so it is easy to damage the ecological environment.

In addition, other conventional paper-made boxes are integrally formed by a pulp-molding process. For example, a PCT International Publication No. WO2011009229A1 discloses that a pair of corresponding lateral snap-in structures are formed on a top paper cover body and a bottom paper-made box body, respectively (as including one lateral recess portion and one lateral protrusion portion); however, these lateral snap-in structures have two technical problems as follows. 1. A molding male and female mold assemblies for respectively forming a top paper cover body and/or a bottom paper body with the lateral snap-in structures, further need to be collocated with additional mold assemblies (e.g., laterally molding sliders) which has other draft direction, so as to form a paper-made product where a portion has an undercut or a negative draft angle; however, at the same time such a design readily makes the structures of the molding male and female molds become complicated, thereby increasing its mold cost and lowering its product manufacturing yield; and 2. Since either of the lateral snap-in structures also are integrally formed with a fine size by a pulp-molding process, a density of the plant fibers gathered in the lateral snap-in structure is insufficient, thereby resulting in an insufficient structural strength and elasticity thereof. This would make the lateral snap-in structures easily collapsed after the lateral snap-in structures repeatedly snapped or released, causing poor product usability.

In addition, some conventional paper-made boxes are formed with a plurality of sidewalls by folding up, punching on, and trimming off a cardboard. For example, a Chinese Patent Publication No. CN204624080U discloses that a bottom paper-made box is made by folding up four sidewalls at right angles relative to a bottom plane and then punching on one of the sidewalls to form a snap-in hole, and a top paper-made cover body is trimmed to form a snap-in portion with a reduced width. However, regardless of either the snap-in hole or the snap-in portion, a stress concentration phenomenon is apt to appear therein and therefore easily damage the structural strength or closure of the entire paper-made product, and the additional process of folding up each upright sidewall would prolong the processing time for the entire paper-made product. Meanwhile, in these conventional paper-made boxes, if a pivot portion (i.e., a portion interconnecting the top cover body and the bottom box body) interconnecting between the top cover body and the bottom box body has a thickness which is too thin to provide a sufficient durability, such that it is easily break down. However, if its thickness is too thick to provide a sufficient elasticity as well as a proper bendability, it is easy to cause a permanent deformation in the product; furthermore, the seal tightness during the snapping between the top cover body and the bottom box body is insufficient to make these conventional paper-made boxes readily open by itself or the snap-in structures thereof damaged during their conveying process.

In addition, some conventional paper-made boxes do not have a pivot portion for interconnecting the top cover body and the bottom box body, which makes the top cover body poor in operability and easy to be lost, and which makes the seal tightness of the snapping between the top cover body and the bottom box body insufficient. For example, a Chinese Patent Publication No. CN108163351A discloses that when a top paper-made cover body and a bottom paper-made box body are mutually matched in a closed manner, a snap-in groove of the top paper cover body is merely fitted into with a top side edge of the bottom paper-made box body, which could not support an enough retentive capability or a seal tightness between the top paper-made cover body and the bottom paper-made box body both in the closed manner, and which is even prone to permanent deformation.

Hence, for solving the afore-mentioned technical issues among the conventional paper-made boxes, it is essential to propose an improved structure for the paper-made box.

SUMMARY OF THE INVENTION

In order to solve the aforementioned technical problems of the conventional arts, an objective of the present invention is to provide a pulp-molded paper container, which is integrally formed by a thermo-compression forming of a wet fiber paper pulp-molding process, having a top cover body, a bottom box body and a pivot portion interconnecting between the top cover body and the bottom box body. It can avoid the damage to the ecological environment, and will not incur the same problems as occurring in the conventional arts where the additional folding process for each of the upright sides of the paper board and the punching process for forming a snap-in hole are required.

Another objective of the present invention is to provide a pulp-molded paper container where structural properties of a pivot portion is strengthened at the same time when the pulp-molded paper container is integrally formed by the thermo-compression forming of a wet fiber paper pulp-molding process, so that the pivot portion simultaneously has both a higher elastic bending and a higher structural strength, to expedite the pivot portion not easy to break after being back-and-forth bent for many times. Furthermore, the pivot portion can be actuated at an elastic bending of larger than or equal to 180 degrees, which is sufficient to accurately and tightly seal the bottom box body with the top cover body.

Another objective of the present invention is to provide a pulp-molded paper container where an overall structure (including a top cover body, a bottom box body and a pivot portion) has positive draft angles relative to a longitudinal draft direction to which a thermo-compression forming mold assembly is directed for a wet fiber paper pulp-molding process. Therefore, it would not incur the same technical problems of increasing the mold cost and lowering the product manufacturing yield, as resulted from the conventional arts where the lateral snap-in structures having negative draft angles (such as a lateral recess portion and a lateral protrusion portion) require usage of a complicated molding assembly having multiple different draft directions (such as the longitudinally-demolded male and female mold assembly in collocation with a additional forming slider mechanism having a lateral draft direction). Also, the present invention does not need formation of an undercut-shaped structure.

Another objective of the present invention is to provide a pulp-molded paper container, which merely utilizes an elastic deformation effect of a recess portion to make both an inner surface of a top sidewall of a top cover body and an outer surface of a bottom sidewall of a bottom box body constituting a plane-to-plane contact with occurrence of a static friction force therebetween. The static friction force is sufficient to make a tight retention occurring along between the top cover body and the bottom box body. Because the top sidewall and the bottom sidewall both are formed with flat surfaces longitudinally extended, there will not incur the same technical problem as resulted from the conventional arts where the lateral snap-in structures, such as hooks, snap-in holes, snap-in bars and so forth, have lateral undercuts.

In order to accomplish the above objectives, the present invention provides a technical proposal of: a pulp-molded paper container, which is integrally formed by a thermo-compression forming of a wet fiber paper pulp-molding process, comprising a top cover body, a bottom box body and at least one pivot portion.

The top cover body has a top sidewall which is formed on the outermost periphery of the top cover body and has an inner surface. The bottom box body has a bottom sidewall which is formed on the outermost periphery of the bottom box body and has an outer surface. The at least one pivot portion is formed between the top cover body and the bottom box body. The at least one pivot portion comprises an upper neck region, a lower neck region and a bendable folding region interconnecting between the upper neck region and the lower neck region. The upper neck region is connected integrally with the top cover body. The lower neck region is connected integrally with the bottom box body. The pulp-molded paper container further comprises: an elastically deformable recess portion formed along and inside the bottom sidewall of the bottom box body. The inner surface of the top sidewall and the outer surface of the bottom sidewall both have longitudinally-extended flat surfaces, thereby constituting a plane-to-plane contact, with occurrence of a static friction force, between the inner surface of the top sidewall and the outer surface of the bottom sidewall, by way of an elastic deformation effect of the recess portion under a manner while the folding region of the at least one pivot portion is elastically bent to make the bottom box body and the top cover body both mutually matched in a closed manner. The static friction force makes a tight retention occurring along between the top cover body and the bottom box body.

In a preferred embodiment, a cross-sectional thickness of the folding region is larger than a cross-sectional thickness of the upper neck region, and the cross-sectional thickness of the folding region is larger than a cross-sectional thickness of the lower neck region.

In a preferred embodiment, a plant-fiber density of the folding region is smaller than a plant-fiber density of the upper neck region, and the plant-fiber density of the folding region is smaller than a plant-fiber density of the lower neck region.

In a preferred embodiment, while the top cover body and the bottom box body both are mutually matched in the closed manner, the folding region of the at least one pivot portion is actuated at an elastic bending of larger than or equal to 180 degrees.

In a preferred embodiment, wherein a side length of the inner surface of the top sidewall is slightly smaller than a side length of the outer surface of the bottom sidewall, such that while the top cover body and the bottom box body are mutually matched in a completely closed manner, the top sidewall and the bottom sidewall are mutually appressed to constitute an interference fit therebetween.

In a preferred embodiment, the top sidewall further comprises a top extension portion located on the outermost side of the top sidewall, and the bottom sidewall further comprises a bottom extension portion located on the outermost side of the bottom sidewall, such that while the top cover body and the bottom box body both are mutually matched in the closed manner, the top extension region is stopped by way of abutting against an edge of the bottom extension region so as to form a stopping effect for movement of the top cover body.

In a preferred embodiment, an overall structure of the pulp-molded paper container has positive draft angles relative to a longitudinal draft direction to which a thermo-compression forming mold assembly is directed for the wet fiber paper pulp-molding process.

In a preferred embodiment, while the top cover body and the bottom box body both are mutually matched in the closed manner, the inner surface of the top sidewall applies a transversely-and-inwardly compressive force onto the outer surface of the bottom sidewall, for transversely compressing the recess portion to generate an inward elastic deformation effect which correspondingly makes the recess portion generating a transversely-and-outwardly elastic counterforce against the inner surface through the outer surface, thereby generating the static friction force occurring along between the outer surface of the top sidewall and the outer surface of the bottom sidewall. The static friction force impedes a longitudinally relative displacement motion along between the inner surface and the outer surface so as to make the tight retention on between the top cover body and the bottom box body after the top cover body and the bottom box body both are mutually matched in the closed manner.

In a preferred embodiment, while the recess portion is compressed by an external force to elastically deform inwardly and thereby make the outer surface of the bottom sidewall actuated at a transverse displacement motion away from the inner surface, the tight retention between the top cover body and the bottom box body is released.

In a preferred embodiment, while an external force overcomes a maximum static friction force occurring along between the inner surface of the top sidewall and the outer surface of the bottom sidewall such that the outer surface of the bottom sidewall is detached from the inner surface of the top sidewall, the tight retention between the top cover body and the bottom box body is released.

Besides, the present invention further provides another technical proposal of: a pulp-molded paper container, which is formed by a thermo-compression forming of a wet fiber paper pulp-molding process, comprising: a top cover body, a bottom box body and at least one pivot portion.

The top cover body has a top sidewall which is formed on the outermost periphery of the top cover body and has an inner surface. The bottom box body has a bottom sidewall which is formed on the outermost periphery of the bottom box body and has an outer surface, and an elastically deformable recess portion formed along and inside the bottom sidewall. The at least one pivot portion used for interconnecting between the top cover body and the bottom box body, comprises an upper neck region located near the top cover body, a lower neck region located near the bottom box body, and a bendable folding region interconnecting between the upper neck region and the lower neck region, wherein a cross-sectional thickness of the folding region is larger than a cross-sectional thickness of the upper neck region, and the cross-sectional thickness of the folding region is larger than a cross-sectional thickness of the lower neck region, and the inner surface of the top sidewall and the outer surface of the bottom sidewall both have longitudinally-extended flat surfaces which constitutes a plane-to-plane contact with occurrence of a static friction force to make a tight retention between the inner surface and the outer surface, by way of an elastic deformation effect of the recess portion under a manner while the bottom box body and the top cover body both are mutually matched in a closed manner.

In a preferred embodiment, the bottom sidewall is further formed with an upward notch, and the bottom sidewall is further formed with a downward notch located opposite to the upward notch, such that while the at least one pivot portion is disposed between the top cover body and the bottom box body, the folding region is accommodated within a through aperture which is structured by building both of the upward and downward notches together in a symmetrical combination arrangement.

In a preferred embodiment, the at least one pivot portion further has an upper wing which is disposed on the top sidewall, for interconnecting between the upper neck region and the top cover body, and a lower wing which is disposed on the bottom sidewall, for interconnecting between the lower neck region and the bottom box body.

The present invention brings the following technical efficiencies that: in comparison with the conventional art, the pulp-molded paper container according to the present invention can prevent the ecological environment from being damaged; furthermore, the structural properties of the pivot portion are strengthened at the same time when the pulp-molded paper container is integrally formed by a thermo-compression forming of a wet fiber paper pulp-molding process, so that the pivot portion simultaneously has both a higher elastic bending and a higher structural strength, which make the pivot portion not easy to break after a back-and-forth bent is performed for many times; furthermore, an overall structure of the pulp-molded paper container has positive draft angles relative to a longitudinal draft direction to which a thermo-compression forming mold assembly is directed for the wet fiber paper pulp-molding process, so there would not incur the same technical problems of increasing the mold cost and lowering the product manufacturing yield, as resulted from the conventional arts where the lateral snap-in structures have negative draft angles, which require usage of a complicated molding assembly having multiple draft directions (such as longitudinally-demolded male and female molds having longitudinal draft direction, accompanied with a additional forming slider mechanism having a lateral draft direction). Also, the present invention does not need the formation of the undercut structures. Furthermore, a pulp-molded paper container according to the present invention merely utilizes an elastic deformation effect of the recess portion to make both the inner surface of the top sidewall and the outer surface of the bottom sidewall constituting a plane-to-plane contact with occurrence of a static friction force therebetween. The static friction force can make a tight retention occurring along between the top cover body and the bottom box body. Because the top sidewall and the bottom sidewall both have longitudinally extended flat surfaces, there would not incur the same technical problem as caused by the conventional arts where the lateral snap-in structures have lateral undercuts, such as hooks, snap-in holes, card bars, and the like.

DESCRIPTION OF THE DIAGRAMS

FIG. 8 depicts a perspective view of a pulp-molded paper container according to a third preferred embodiment of the present invention;

FIG. 9 depicts a partially explored view of the pulp-molded paper container shown in FIG. 8; and FIG. 10 depicts a laterally cross-sectional view of a pivot portion according to a sectioning line B-B shown in FIG. 9; and FIG. 11 depicts a partially cross-sectional view of the pulp-molded paper container according to a sectioning line C-C shown in FIG. 8.

DETAILED DESCRIPTION OF THE PREFERRED EMBODIMENTS

Figure 1:
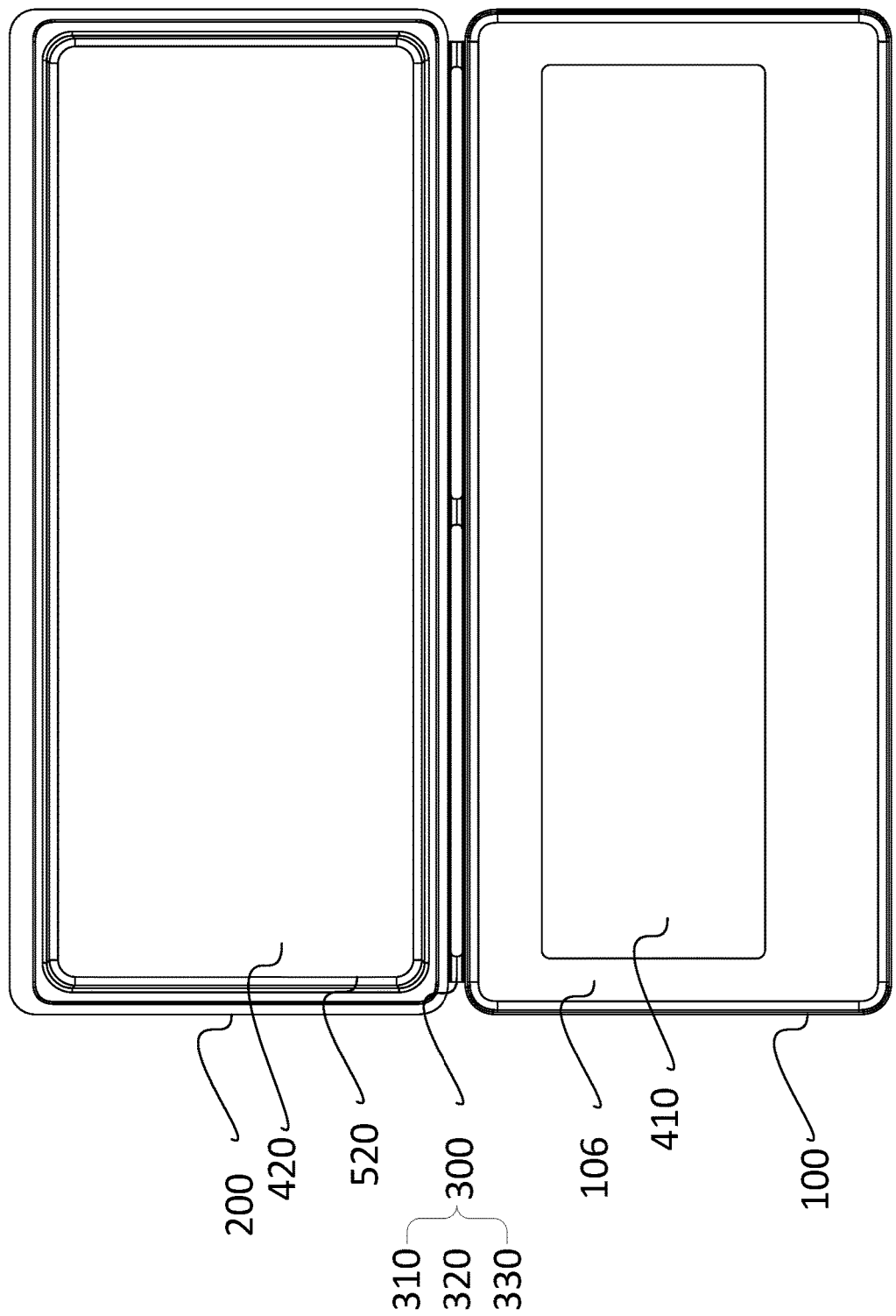
FIG. 1 depicts a top view of both a top cover body and a bottom box body of the pulp-molded paper container according to the present invention before matched mutually in a closed manner.

The technical proposals in the embodiments of the present invention will be clearly and completely described in the following with reference to the accompanying drawings of the embodiments of the present invention. The directional terms mentioned in the present invention, such as "upper", "lower", "before", "after", "left", "right", "inside", "outside", "side", etc., are merely illustrative the direction of the drawing. Therefore, the directional terminology used is for the purpose of illustration and understanding of the invention, which is not intended to limit the invention.

Figure 2:
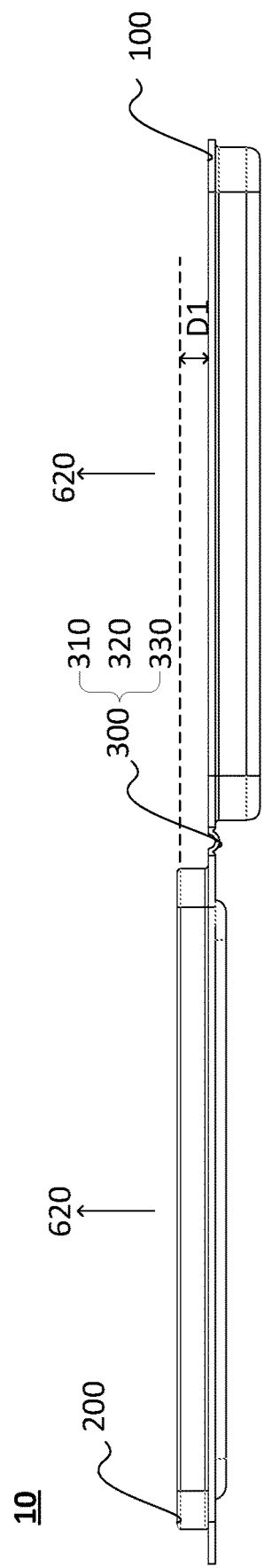
FIG. 2 depicts a side view of both the top cover body and the bottom box body of the pulp-molded paper container according to the present invention before matched mutually in a closed manner.

First of all, please refer to FIGS. 1 & 2. FIG. 1 depicts a top view of both a top cover body 100 and a bottom box body 200 of a pulp-molded paper container 10 according to the present invention before matched mutually in a closed manner. FIG. 2 depicts a side view before of the top cover body 100 and the bottom box body 200 of the pulp-molded paper container 10 according to the present invention before matched mutually in the closed manner. The pulp-molded paper container 10 is primarily structured with a top cover body 100, a bottom box body 200 and at least one pivot portion 300 (such as a hinge). In the present preferred embodiment, the at least one pivot portion 300 of the pulp-molded paper container 10 comprises three pivot portions 300; however, a quantity of the pivot portions 300 is not therefore limited thereto. As shown in FIG. 1, the top cover body further comprises a top convex portion 106 protruding outwardly from the center of the top cover body 106, and an observation window 410 defined in the top convex portion 106. The bottom box body 200 further comprises a pit 420 (but it can also be regarded as a lower convex portion 420 if observed in reverse of the view shown in the FIG. 1). However, the positions of the top convex portion 106, the pit 420, and the observation window 410 are not limited to by the preferred embodiment.

Preferably, as the illustrations shown in FIG. 1 and FIG. 2, an overall structure of the pulp-molded paper container 10 (including the top cover body 100, the bottom box body 200 and the at least one pivot portion 300) is one-time thermo-compression integrally formed by the same set of male and female thermo-compression forming mold assembly (not shown) employed for a wet fiber paper pulp-molding process. Furthermore, the overall structure of the pulp-molded paper container 10 has positive draft angles relative to a longitudinal draft direction 620 which the thermo-compression forming mold assembly is directed to, so it would not incur the same technical problem as resulted from the conventional arts where the lateral snap-in structures (such as a lateral recess portion and a lateral protrusion portion) all have negative draft angles, which require usage of a complicated molding assembly having multiple draft directions (such as longitudinally-demolded male and female molds, having longitudinal draft direction, in collocation with a additional forming slider mechanism having a lateral draft direction). Also, the present invention does not need the formation of the undercut structures. Even when the pulp-molded paper container 10 is integrally manufactured, it is not necessary to separately make the forming of the top cover body 100, the bottom box body 200 and the at least one pivot portion 300, and thus its process steps and mold costs will not be increased. In other words, the top cover body 100, the bottom box body 200 and the at least one pivot portion 300 can be thermo-compression integrally formed under the same set of mold assemblies used in the same process step.

Figure 3:
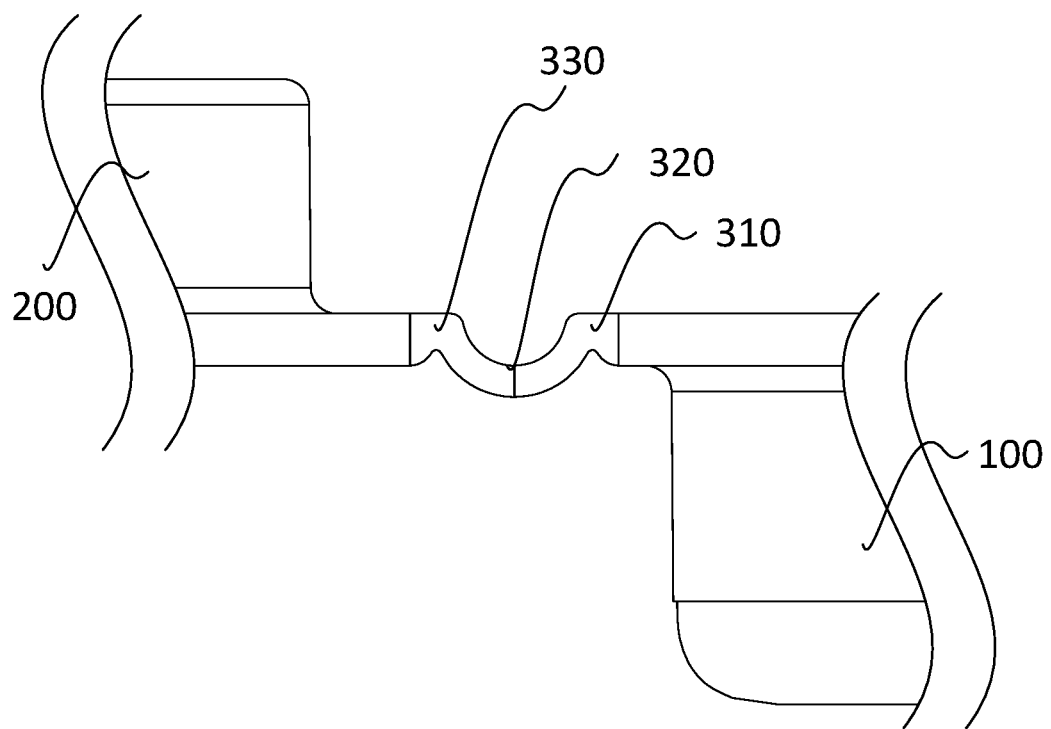
FIG. 3 depicts an enlarged view of a pivot portion shown in the FIG. 2.

Please further refer to FIG. 2 and FIG. 3. FIG. 3 depicts an enlarged view of the pivot portion 300 of the FIG. 2. The at least one pivot portion 300 is configurable for convenience on the users' operations to open or close the bottom box body 200 with the top cover body 100.

The at least one pivot portion 300 comprises an upper neck region 310, a lower neck region 330 and a bendable folding region 320 interconnecting between the upper neck region 310 and the lower neck region 330. The upper neck region 310 and the top cover body 100 are connected integrally with each other. The lower neck region 330 and the bottom box body 100 are connected integrally with each other. Besides, in the present invention, the pulp-molded paper container 10 is integrally manufactured by the following steps of the wet fiber paper pulp-molding process, which comprises:

forming a wet rough body with plant fibers;

only by a set of male and female thermo-compression mold assemblies (not shown) being upwardly-and-downwardly matched where the wet rough body is located, one-time thermo-compression integrally forming an overall structure of the pulp-molded paper container 10 (including the top cover body 100, the bottom box body 200 and the at least one pivot portion 300); and implementing a cutting step on the pulp-molding container 10, for producing a corresponding finished product.

Please further refer to the illustrations of FIG. 2 and FIG. 3. With the one-time thermo-compression integrally forming by the male and female thermo-compression forming mold assembly (not shown), the overall structure of the pulp-molded paper container 10 has positive draft angles relative to a longitudinal draft direction 620 which the male and female thermo-compression forming mold assembly is directed to. At the same time of the thermo-compression integrally forming, either of the components of the pulp-molded paper container 10 have different positions and shapes in the male and female thermo-compression mold assemblies. For example, a vertical height difference D1 is formed between the highest surface of the top cover body 100 and the highest surface of the box body 200 so as to ensure that with the top cover body 100 and the bottom box body 200 both are effectively matched in a closed manner. Before the top cover body 100 and the bottom box body 200 both are matched in the closed manner, the after-formed at least one pivot portion 300 renders a bend smaller than 180 degrees.

Please further refer to the embodiments of the FIG. 2 and FIG. 3, in the present invention, at the same time when the overall structure of the pulp-molded paper container 10 is one-time thermo-compression integrally formed by the male and female thermo-compression forming mold assembly (not shown), a cross-sectional thickness of the folding region 320 is made larger than a cross-sectional thickness of the upper neck region 310 in the at least one pivot portion 300, and the cross-sectional thickness of the folding region 320 is made larger than a cross-sectional thickness of the lower neck region 330 in the at least one pivot portion 300. The reason is that although a density of the plant fibers contained in the wet rough body is substantially even at the initial stage, when the male and female thermo-compression mold assemblies both having various different-thickness shapes are mutually matched where the wet rough body is placed, various components of the pulp-molded paper container 10 are thermo-compression integrally formed with different thicknesses and different plant-fiber densities.

For example, by pressures applied from the narrower shapes of the male and female thermo-compression mold assemblies, some portions of the after-formed pivot portion 300 (such as the upper neck region 310 and the lower neck region 330) become smaller in their cross-sectional thicknesses as well as higher in the density of the plant fibers contained therein (in order to achieve better structural properties). In contrast, by pressures applied from the broader shapes of the male and female thermo-compression mold assemblies, other portions of the after-formed pivot portion 300 (such as the folding region 320) become larger in their cross-sectional thicknesses as well as lower in the density of the plant fibers contained therein (in order to achieve well elasticity and easily bending properties). In the present invention, both sides of the folding region 320 having larger thickness and well elasticity are respectively connected with both the upper neck region 310 and the lower neck region 330 having smaller thickness and higher structural strength. Hence, the present invention provides a preferred technical proposal for making the at least one pivot portion 300 having both a higher elastic bending and a higher structural strength. According to actual experiments, the pivot portion 300 of the present invention can be actuated at an elastic bending of larger than or equal to 180 degrees and still can not be broken after actuated at the positive-and-negative bendings of more than 2,000 cycles. It should be noted that the plant-fiber density referred to herein is generally a plant-fiber density of the finished or semi-finished product of the pulp-molded paper container 10 after the wet rough body is processed by the thermo-compression integral formation of the wet fiber paper pulp-molding process. With the improvement of the present invention to the structural properties of the at least one pivot portion 300, the technical problems of the conventional arts where either the structural strength or the elasticity of the pivot portion is insufficient can be avoided.

In the preferred embodiment, the three pivot portions 300 illustrated in FIG. 1 have the same design; however, in the present invention, the three pivot portions 300 can respectively have different designs on different demands. For example, different portions of the three pivot portions 300 respectively have different fiber densities and/or different cross-sectional thickness dimensions.

Figure 4:
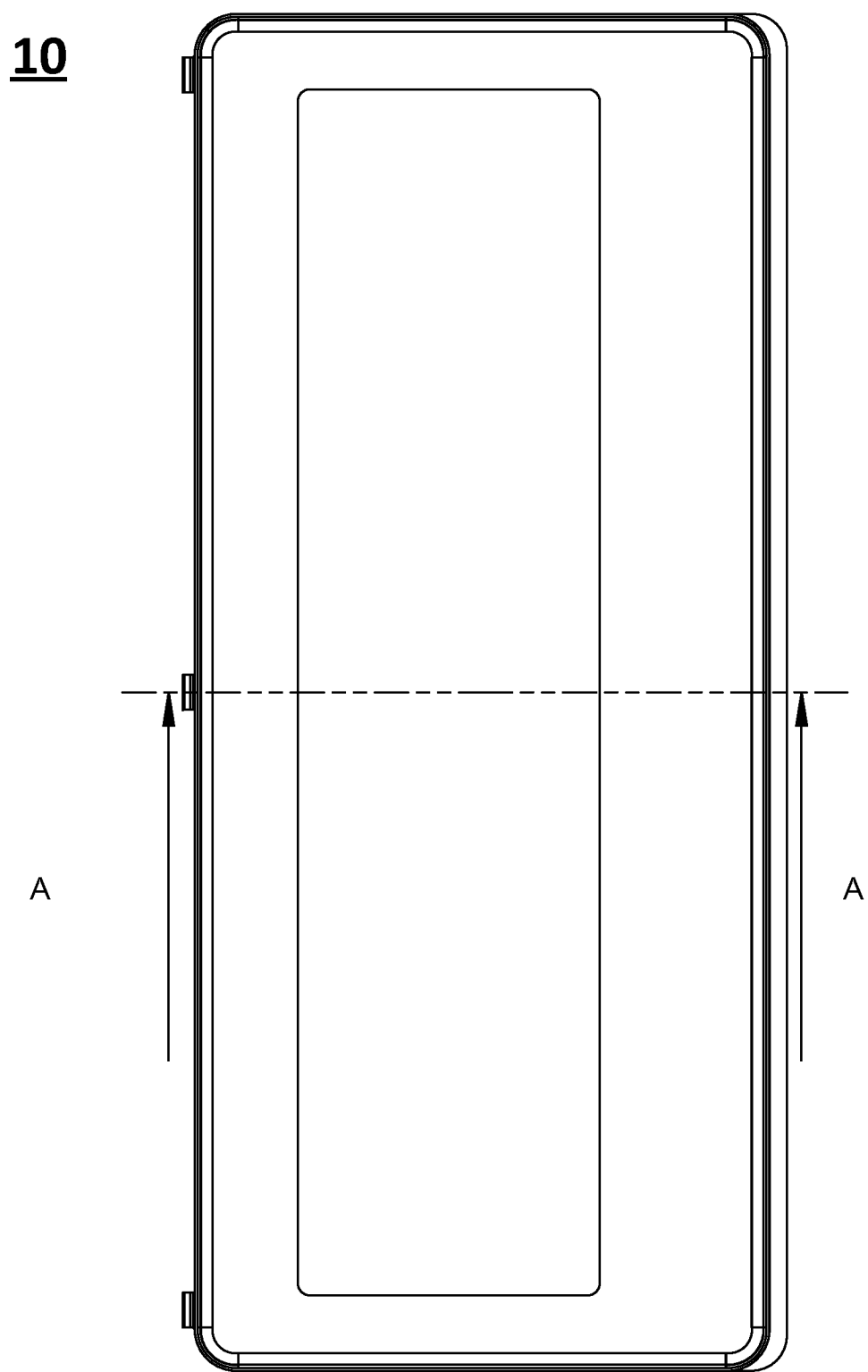
FIG. 4 depicts a top view of both the top cover body and the bottom box body of the pulp-molded paper container according to the present invention after matched mutually in the closed manner.
Figure 5:
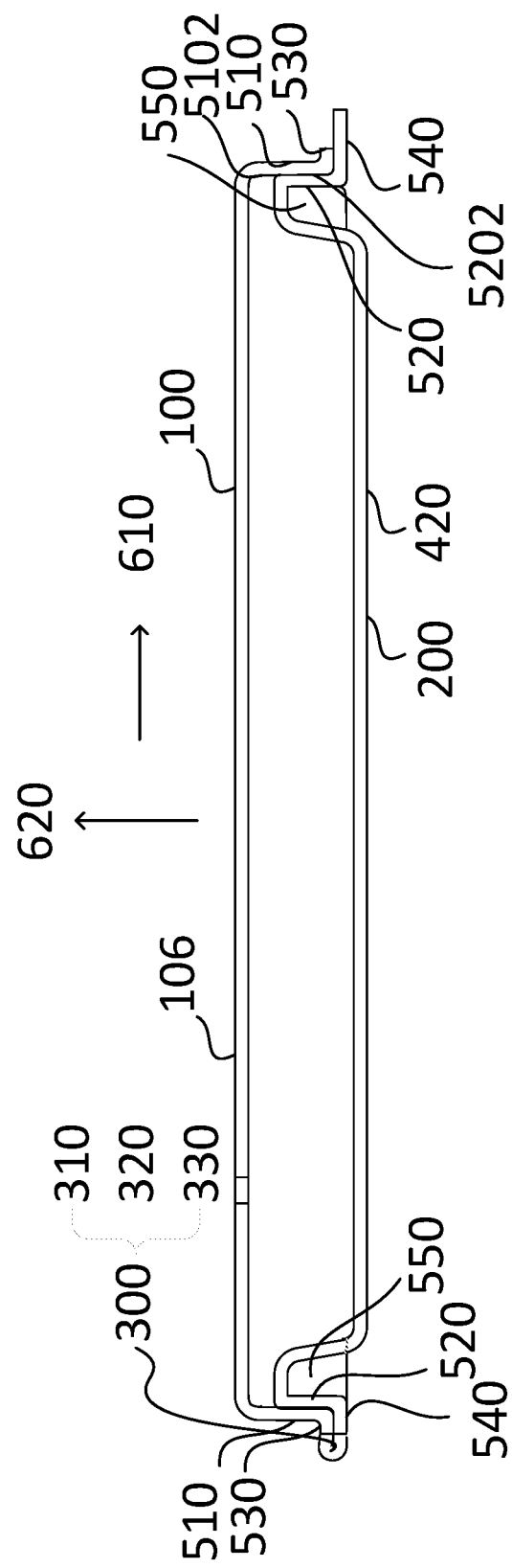
FIG. 5 depicts a cross-sectional view according to a sectioning line A-A shown in the FIG. 4.
Figure 6:
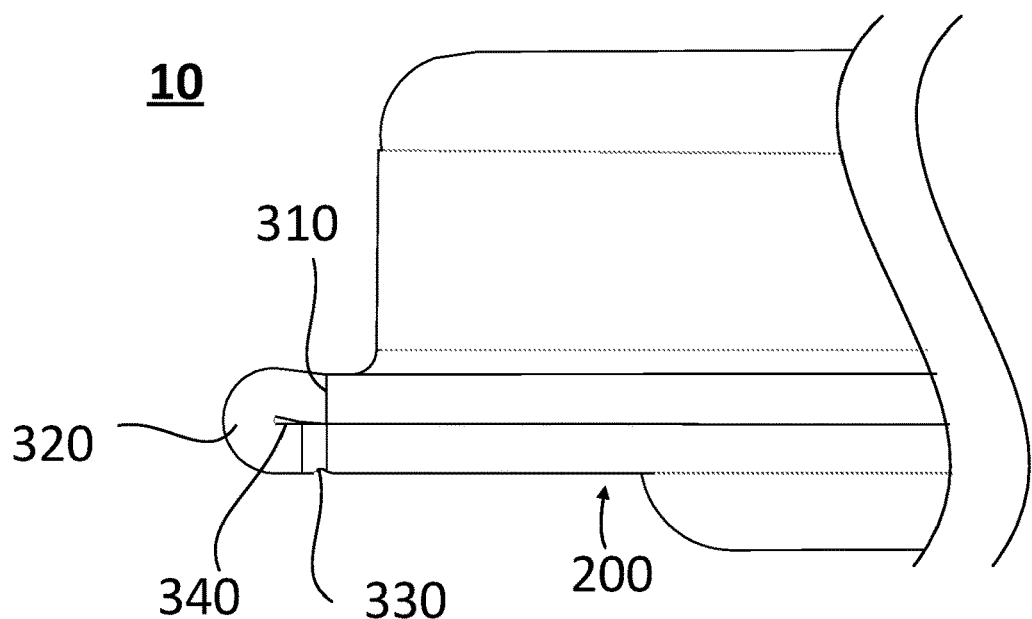
FIG. 6 depicts an enlarged view of the pivot portion shown in the FIG. 5.

Please refer to FIGS. 4-6. FIG. 4 depicts a top view of both the top cover body 100 and the bottom box body 200 of the pulp-molded paper container 10 after matched mutually in the closed manner, according to the present invention. FIG. 5 depicts a cross-sectional view according to a sectioning line A-A of the FIG. 4. And FIG. 6 depicts an enlarged view of the pivot portion 300 of the FIG. 5.

Please further refer to the embodiments of FIG. 5 and FIG. 6. The top cover body 100 further comprises a top sidewall 510 extending downward along the outermost periphery of the top convex portion 106, and the bottom box body 200 further comprises a bottom sidewall 520 extending downward along the outermost periphery of the pit 420, and an elastically deformable recess portion 550 formed along an inner periphery of the bottom sidewall 520, wherein before the top cover body 100 and the bottom box body 200 both are mutually matched in the closed manner, a longer-side length of an inner surface 5102 of the top sidewall 510 is slightly smaller than a longer-side length of an outer surface 5202 of the bottom sidewall 520, and the recess portion 550 that is recessed toward the top cover body 100 is located between the bottom sidewall 520 and the pit 420. While the at least one pivot portion 300 is actuated at an elastic bending of larger than or equal to 180 degrees, thereby expediting both the top cover body 100 and the bottom box body contacting with each other, it is adequate to make the top sidewall 510 of the top cover body 100 and the bottom sidewall 520 of the bottom box body 200 both accurately and tightly appressed mutually onto in a plane-to-plane contact manner which constitutes an interference fit therebetween. It should be particularly noted that the top sidewall 510 and the bottom sidewall 520 both are principally rib-like structures respectively disposed on the outmost edges of both of the top cover body 100 and the bottom box body 200. It is understandable that those rib-like structures should have a certain thickness for attaining a certain structural strength. In more details, as the embodiment illustrated in FIG. 5, an inner periphery defined around by the inner surface 5102 of the top sidewall 510 of the top cover body 100 has an inner circumferential length smaller than an outer circumferential length of an outer periphery defined around by the outer surface 5202 of the bottom sidewall 520 of the bottom box body 200. Therefore, while the top cover body 100 is mutually matched with the bottom box body 200 in the closed manner, the inner surface 5102 of the top sidewall 510 of the top cover body 100 and the outer surface 5202 of the bottom sidewall 520 of the bottom box body 200 both are arranged in a laterally overlapping arrangement, as constituting an interference fit therebetween. The interference fit will make the inner surface 5102 of the top sidewall 510 of the top cover body 100 apply a transversely-and-inwardly compressive force onto the outer surface 5202 of the bottom sidewall 520 of the bottom box body 200. The transversely-and-inwardly compressive force will compress the recess portion 550 transversely, for correspondingly making the recess portion 550 generating an elastic deformation effect which causes the recess portion 550 generating a transversely-and-outwardly elastic counterforce onto the inner surface 5102 through the outer surface 5202, so as to correspondingly resist against the transversely-and-inwardly compressive force. With occurrences of both the transversely-and-inwardly compressive force and the transversely-and-outwardly elastic counterforce, the plane-to-plane contact is established between the inner surface 5012 of the top sidewall 510 and the outer surface 5202 of the bottom sidewall 520, thereby generating a static friction force therebetween to impede a longitudinally relative displacement motion along between the inner surface 5102 and the outer surface 5202, so as to form an effectively tight retention or a higher tightly sealing between the top cover body 100 and the bottom box body 200 after the top cover body 100 and the bottom box body 200 both are matched mutually in the closed manner.

Preferably, as illustrated in FIG. 5, the inner surface 5102 of the top sidewall 510 and the outer surface 5202 of the bottom sidewall 520 both have longitudinally-extended flat surfaces (without occurrence of lateral snap-in structures in the conventional arts, such as hooks, snap-in holes, snap-in strips, and the likes, which require lateral demold). Only with the static friction force generated by the plane-to-plane contact between the inner surface 5102 and the outer surface 5202, it is adequate to constitute a tight retention between the top cover body 100 and the bottom box body 200. In the preferred embodiment, an overall structure of the pulp-molded paper container 10 has positive draft angles relative to a longitudinal draft direction to which a thermo-compression forming mold assembly is directed for the wet fiber paper pulp-molding process. Since there is no formation of any lateral snap-in structures having negative draft angles as introduced in the conventional arts, it does not need a complicated molding assembly having multiple different draft directions (such as the male and female molds both having longitudinal draft directions, in collocation with an additional forming slider mechanism having a lateral draft direction) which incurs the technical problems of increasing the mold cost and lowering the product manufacturing yield. Also, in the present invention, it does not need to form undercut structures thereon.

At the same time, it should be noted that, as illustrated in FIGS. 5 & 6, when the folding region 320 of the at least one pivot portion 300 is actuated at an elastic bending of larger than or equal to 180 degrees and thereby expedites the top cover body 100 and the bottom box body 200 both tightly retained with each other, the folding region 320 of the at least one pivot portion 300 forms an appropriate compressible-reserved space 340 between the upper neck region 310 and the lower neck region 330. The compression-reserved space 340 functions on ensuring the degrees of both of the tightly sealing and the further tight retention between the top cover body 100 and the bottom box body 200. If the compressible-reserved space 340 is too large or too small, it means that the lengths/thickness design of the upper neck region 310, the lower neck region 330 and the folding region 320, which will affect the bending degree of the pivot portion 300. For example, if a cross-sectional thickness of the at least one pivot portion 300 is too thick, it is prone to make the bending degree of the at least one pivot portion 300 less than 180 degrees, causing an ineffective tightly sealing between the top cover body 100 and the bottom box body 200 (such as a half opened manner), or further causing no tight retention between the top cover body 100 and the bottom box body 200. Probably, a durability of the at least one pivot portion 300 will be affected therefore, i.e., the at least one pivot portion 300 has an insufficient elasticity, so it is easy to break while bent. In contrast, if a cross-sectional thickness of the at least one pivot portion 300 is too thin, the structural strength of the at least one pivot portion 300 will be affected therefore. in an exemplary manner, after repeated in forth-and-back bendings of less than 10 times, the at least one pivot portion 300 will be broken.

In another preferred embodiment, while the recess portion 550 is inwardly compressed by an external force, the recess portion 550 is rendered to elastically deform inwardly and thereby bring the outer surface 5202 of the bottom sidewall 520 to actuate a transverse displacement motion away from the inner surface 5102 so as to easily release the tight retention between the top cover body 100 and the bottom box body 200.

In another preferred embodiment, while an external force overcomes a maximum static friction force occurring along between the inner surface 5102 of the top sidewall 510 and the outer surface 5202 of the bottom sidewall 520, the outer surface 5202 of the bottom sidewall 520 is rendered to be detached from the inner surface 5102 of the top sidewall 510 so as to easily release the tight retention between the top cover body 100 and the bottom box body 200.

As showing in FIG. 5, the top sidewall 510 further includes a top extension portion 530 that is extended outwardly-and-transversely, and the bottom sidewall 520 further includes a bottom extension portion 540 which is extended outwardly-and-transversely. While the top cover body 100 and the bottom box body 200 both are mutually matched in a completely closed manner, the top extension region 530 is just on abutting against an edge of the bottom extension region 540, for providing a stopping effect for further movement of the top cover body 100, wherein the top extension portion 530 of the top sidewall 510 and the bottom extension portion 540 of the bottom sidewall 520 both are a lower edge which is transversely bent and then horizontally extended along a first direction 610. Its function is to enforce the entire structural strength of both the top sidewall 510 and the bottom sidewall 520, in order to prevent the top sidewall 510 and/or the bottom sidewall 630 subjected to the compression, from incurring the problem of cracking or permanent deformation, while an interference fit made between the top cover body 100 and the bottom box body 200; meanwhile, it can greatly decrease the problem of cracking or permanent deformation caused by a stress concentration which occurs in the lower edges of both the top sidewall 510 and the bottom sidewall 630 and thereby affects the function and appearance of the pulp-molded paper container 10.

In the preferred embodiment, since the top cover body 100 and the bottom box body 200 both plane-to-plane contact with each other by a large-size area (including the plane-to-plane contact between the inner surface 5102 and the outer surface 5202, and the plane-to-plane contact between the top extension region 530 and the bottom extension region 540) so as to constitute the above-mentioned tight retention, so that the pulp-molded paper container 10 of the present invention can certain-extent avoid the internal accommodation stored in the pulp-molded paper container 10 being dropped out.

Figure 7:
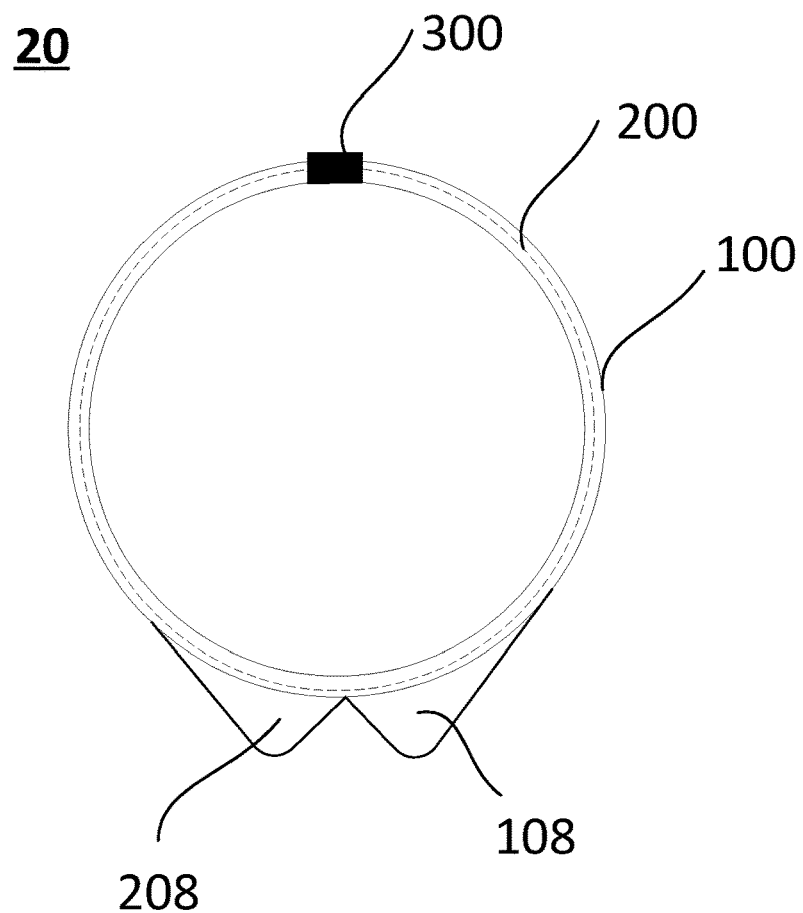
FIG. 7 depicts a top view of a pulp-molded paper container according to a second preferred embodiment of the present invention.

Please refer to FIG. 7 depicts a top view of the pulp-molded paper container 20 according to a second preferred embodiment of the present invention. Since the pulp-molded paper container 20 shown in FIG. 7 has the components, their functions and manufacturing process mostly similar to those of the pulp-molded paper container 10 of FIGS. 1-6, the same numeral references, functions and manufacturing process in details for the respective same components used in the second preferred embodiment all can refer to the illustrations shown in FIGS. 1-6, and therefore will not be redescribed hereinafter, except that a partially structural difference of the pulp-molded paper container 20 shown in FIG. 7 from the pulp-molded paper container 10 shown in FIG. 1 is introduced that: the pulp-molded paper container 20 shown in FIG. 7 is rendered in a cylinder structure where the top cover body 100 is rendered by a round cover body with an outwardly-projecting upper tongue piece 108, and the bottom box body 200 is rendered in an upright cylinder and forms an outwardly-projecting lower tongue piece 208 located at an opening thereof. While the at least one pivot portion 300 is actuated at an elastic bending of larger than or equal to 180 degrees to make the top cover body 100 and the bottom box body 200 mutually matched in the closed manner, the upper tongue piece 108 overlaps above the lower tongue piece 208, whereas the upper tongue piece 108 and the lower tongue piece 208 both are respectively extended in different directions to constitute a bifurcated shape which will be beneficial for the users' operations on opening or closing the top cover body 100 with relation to the bottom box body 200, by way of using both the upper tongue piece 108 and the lower tongue piece 208. In the preferred embodiment, only one set of the pivot portions 300 is provided. However, different numbers of the pivot portions 300 may be disposed according to different requirements, and are not limited thereto. As the foregoing technical benefits, the large-sized and plane-to-plane contact can constitute a large range of tight retention and close-fit between the top cover body 100 and the bottom box body 200, so the pulp-molded paper container 20 of the present invention can certain-extent prevent the leakage of internal contents (e.g., liquid) stored therein.

Further referring to the illustrations shown in FIGS. 8-11, FIG. 8 depicts a perspective view of a pulp-molded paper container 30 according to a third preferred embodiment of the present invention. Since the pulp-molded paper container 30 shown in FIGS. 8-11 has the components, their functions and manufacturing process mostly similar to those of the pulp-molded paper container 10 of FIGS. 1-6, the same numeral references, functions and manufacturing process in details for the respective same components used in the third preferred embodiment, such as the inner surface 5102 of the top sidewall 510 formed on the outermost periphery of the top cover body 100, the outer surface 5202 of the bottom sidewall 520 formed on the outermost periphery of the bottom box body 200, and an elastically deformable recess portion 550 formed along and inside the bottom sidewall 520, all can refer to the illustrations shown in FIGS. 1-6, and therefore will not be redescribed hereinafter, except that a partially structural difference of the pulp-molded paper container 30 shown in FIGS. 8-11 from the pulp-molded paper container 10 shown in FIG. 1 is introduced that: the pulp-molded paper container 30 shown in FIG. 8, comprises a top cover body 100, a bottom box body 200 and at least one pivot portion 300, the three components of which are formed independently from each other by a thermo-compression forming of a wet fiber paper pulp-molding process, and are respectively disposed with each other for complete assembly of a finished pulp-molded paper container 30.

Furthermore, in the third preferred embodiment as shown in FIG. 9 which depicts a partially explored view of the pulp-molded paper container 30 shown in FIG. 8, the top sidewall 510 is further formed with a downward notch 5104 notched on a side edge of the top sidewall 510, and the bottom sidewall 520 is further formed with an upward notch 5204 notched on a side edge of the bottom sidewall 520 and located opposite to the downward notch 5104.

Furthermore, in the third preferred embodiment as shown in FIG. 10 which depicts a laterally cross-sectional view of the at least one pivot portion 300 according to a sectioning line B-B shown in FIG. 9, the at least one pivot portion 300 further comprises an upper neck region 310, a lower neck region 330, and a bendable folding region 320 interconnecting between the upper neck region 310 and the lower neck region 330. In the third preferred embodiment, the at least one pivot portion 300 further has an upper wing 3102 and a lower wing 3302. The upper wing 3102 is outwardly extended from the upper neck region 310. The lower wing 3302 is outwardly extended from the lower neck region 330 toward a direction different from which the upper wing 3102 is extended in.

For the assembly of mutually matching both the top cover body 100 and the bottom box body 200 in the closed manner (as shown in FIG. 8), the side edges of both the top sidewall 510 and the bottom sidewall 520 closely abut against and toward each other in longitudinal alignment (as shown in FIG. 9) such that a complete through aperture 500 can be structured therefore by longitudinally building both of the upward and downward notches 5104, 5204 together in a symmetrical combination arrangement (as shown in FIGS. 8 & 11).

Further referring to the illustrations shown in FIGS. 8-9 & 11, FIG. 11 depicts a partially cross-sectional view of the pulp-molded paper container 30 according to a sectioning line C-C shown in FIG. 8. In further assembly of disposing adhesively the at least one pivot portion 300 between the top cover body 100 and the bottom box body 200 (as shown in FIGS. 9 &11), the upper wing 3102 of the at least one pivot portion 300 is disposed by adhesion onto a back portion of the top sidewall 510 and thereby firmly interconnecting between the upper neck region 310 and the top sidewall 510 of the top cover body 100. And, the lower wing 3302 is disposed by adhesion onto a back portion of the bottom sidewall 520 and thereby firmly interconnecting between the lower neck region 330 and the bottom sidewall 520 of the bottom box body 200. As shown in FIG. 11, after the at least one pivot portion 300 is disposed adhesively between the top cover body 100 and the bottom box body 200 by way of adhesions of said wings 3102, 3302, the upper neck region 310 will be allocated near the top cover body 100, the lower neck region 330 will be allocated near the bottom box body 200, and the folding region 320 of the at least one pivot portion 300 can be partially or entirely accommodated therefore within the through aperture 500 (as shown in FIGS. 8 & 11), no matter whether the top sidewall 510 and the bottom sidewall 520 both are situated in the closed or opening manner, whereby the at least one pivot portion 300 can firmly interconnect between the top cover body 100 and the bottom box body 200 (as shown in FIG. 11).

Understandingly, the foregoing terms 'disposed by adhesion' or 'disposed adhesively' can be accomplished by coating an adhesive material 3016 or the likes onto between the back portions (i.e. the most inner surfaces) of the sidewalls 510, 520 and these wings 3102, 3302. However, in alternative embodiment, the adhesive material 3016 or the likes can be altered to be also coated onto between the front portions (i.e. the most outer surfaces) of the sidewalls 510, 520 and these wings 3102, 3302.

Eventually, the third preferred embodiment as shown in FIGS. 8-11 will achieve the same function as shown in FIG. 5 that the inner surface 5102 of the top sidewall 510 and the outer surface 5202 of the bottom sidewall 520 both have longitudinally-extended flat surfaces which constitutes a plane-to-plane contact with occurrence of a static friction force to make a tight retention between the inner surface 5102 and the outer surface 5202, by way of an elastic deformation effect of the recess portion 550 under a manner while the assembly of mutually matching both the top cover body 100 and the bottom box body 200 in the closed manner (as shown in FIG. 8) is completed.

As described above, although the present invention has been described with the preferred embodiments thereof, those skilled in the art will appreciate that various modifications, additions, and substitutions are possible without departing from the scope and the spirit of the invention. Accordingly, the scope of the present invention is intended to be defined only by reference to the claims.

What is claimed is:

1. A pulp-molded paper container, which is integrally formed, with only use of plant fibers, only by a thermo-compression forming of a wet fiber paper pulp-molding process, comprising:
    a top cover body, having a top sidewall which is integrally formed with the outermost periphery of the top cover body and has an inner surface;
    a bottom box body, having a bottom sidewall which is integrally formed with the outermost periphery of the bottom box body and has an outer surface;
    at least one pivot portion formed between the top cover body and the bottom box body, comprising an upper neck region, a lower neck region and a bendable folding region interconnecting between the upper neck region and the lower neck region, wherein the upper neck region is connected integrally with the top cover body, the lower neck region is connected integrally with the bottom box body, and characterized in that, the pulp-molded paper container further comprises:
        an elastically deformable recess portion, integrally formed along and within an inner periphery of the bottom sidewall of the bottom box body; and
        the inner surface of the top sidewall and the outer surface of the bottom sidewall both of which are longitudinally-extended flat surfaces without formation of lateral snap-in structure thereon, are tightly appressed mutually to transversely-and-inwardly compress the recess portion in a transverse-and-inward elastic deformation effect that makes the recess portion generating a transversely-and-outwardly elastic counterforce onto the inner surface, thereby constituting a plane-to-plane contact, with occurrence of a static friction force, between the inner surface of the top sidewall and the outer surface of the bottom sidewall, while the folding region of the at least one pivot portion is elastically bent to make the bottom box body and the top cover body both mutually matched in the closed manner, wherein only using the plane-to-plane contact between the longitudinally-extended flat surfaces, with occurrence of the static friction force but without occurrence of snapping, makes a tight retention occurring along between the inner surface of the top sidewall of the top cover body and the outer surface of the bottom sidewall of the bottom box body.

2. The pulp-molded paper container according to claim 1, wherein a cross-sectional thickness of the folding region is larger than a cross-sectional thickness of the upper neck region, and the cross-sectional thickness of the folding region is larger than a cross-sectional thickness of the lower neck region.

3. The pulp-molded paper container according to claim 1, wherein a plant-fiber density of the folding region is smaller than a plant-fiber density of the upper neck region, and the plant-fiber density of the folding region is smaller than a plant-fiber density of the lower neck region.

4. The pulp-molded paper container according to claim 1, wherein while the top cover body and the bottom box body both are mutually matched in the closed manner, the folding region of the at least one pivot portion is actuated at an elastic bending of larger than or equal to 180 degrees.

5. The pulp-molded paper container according to claim 1, wherein a side length of the inner surface of the top sidewall is slightly smaller than a side length of the outer surface of the bottom sidewall, such that while the top cover body and the bottom box body both are mutually matched in the closed manner, the top sidewall and the bottom sidewall are mutually appressed to constitute an interference fit therebetween.

6. The pulp-molded paper container according to claim 1, wherein the top sidewall further comprises a top extension portion located on the outermost side of the top sidewall, and the bottom sidewall further comprises a bottom extension portion located on the outermost side of the bottom sidewall, such that while the top cover body and the bottom box body are mutually matched in a completely closed manner, the top extension region is stopped by way of abutting against an edge of the bottom extension region so as to form a stopping effect for movement of the top cover body.

7. The pulp-molded paper container according to claim 1, wherein an overall structure of the pulp-molded paper container has positive draft angles relative to a longitudinal draft direction to which a thermo-compression forming mold assembly is directed for the wet fiber paper pulp-molding process.

8. The pulp-molded paper container according to claim 1, wherein while the top cover body and the bottom box body both are mutually matched in the closed manner, the inner surface of the top sidewall applies a transversely-and-inwardly compressive force onto the outer surface of the bottom sidewall, for transversely compressing the recess portion to generate the elastic deformation effect which correspondingly makes the recess portion generating the transversely-and-outwardly elastic counterforce against the inner surface through the outer surface, thereby generating the static friction force occurring along between the outer surface of the top sidewall and the outer surface of the bottom sidewall, wherein the static friction force impedes a longitudinally relative displacement motion along between the inner surface and the outer surface so as to make the tight retention on between the top cover body and the bottom box body after the top cover body and the bottom box body both are mutually matched in the closed manner.

9. The pulp-molded paper container according to claim 1, wherein while the recess portion is compressed by an external force to elastically deform inwardly and thereby make the outer surface of the bottom sidewall actuated at a transverse displacement motion away from the inner surface, the tight retention between the top cover body and the bottom box body is released.

10. The pulp-molded paper container according to claim 1, wherein while an external force overcomes a maximum static friction force occurring along between the inner surface of the top sidewall and the outer surface of the bottom sidewall such that the outer surface of the bottom sidewall is detached from the inner surface of the top sidewall, and the tight retention between the top cover body and the bottom box body is released.

11. A pulp-molded paper container, which is integrally formed, with only use of plant fibers, only by a thermo-compression forming of a wet fiber paper pulp-molding process, comprising:
a top cover body, having a top sidewall which is integrally formed with the outermost periphery of the top cover body and has an inner surface;
a bottom box body, having a bottom sidewall which is formed on the outermost periphery of the bottom box body and has an outer surface, and an elastically deformable recess portion integrally formed along and within an inner periphery of the bottom sidewall; and
at least one pivot portion, used for interconnecting between the top cover body and the bottom box body, comprising an upper neck region located near the top cover body, a lower neck region located near the bottom box body, and a bendable folding region interconnecting between the upper neck region and the lower neck region, wherein a cross-sectional thickness of the folding region is larger than a cross-sectional thickness of the upper neck region, and the cross-sectional thickness of the folding region is larger than a cross-sectional thickness of the lower neck region, and the inner surface of the top sidewall and the outer surface of the bottom sidewall both are longitudinally-extended flat surfaces which without formation of lateral snap-in structure thereon, and are tightly appressed mutually to transversely-and-inwardly compress the recess portion in a transverse-and-inward elastic deformation effect that makes the recess portion generating a transversely-and-outwardly elastic counterforce onto the inner surface, and thereby constitutes a plane-to-plane contact with occurrence of a static friction force while the bottom box body and the top cover body both are mutually matched in the closed manner, wherein only using the plane-to-plane contact between the longitudinally-extended flat surfaces, with occurrence of the static friction force but without occurrence of snapping, makes a tight retention occurring along between the inner surface of the top sidewall of the top cover body and the outer surface of the bottom sidewall of the bottom box body.

12. The pulp-molded paper container according to claim 11, wherein the bottom sidewall is further formed with an upward notch, and the bottom sidewall is further formed with a downward notch located opposite to the upward notch, such that while the at least one pivot portion is disposed between the top cover body and the bottom box body, the folding region is accommodated within a through aperture which is structured by building both of the upward and downward notches together in a symmetrical combination arrangement.

13. The pulp-molded paper container according to claim 11, wherein the at least one pivot portion further has an upper wing which is disposed on the top sidewall, for interconnecting between the upper neck region and the top cover body, and a lower wing which is disposed on the bottom sidewall, for interconnecting between the lower neck region and the bottom box body.

* * * * *